United States Patent [19]
Holley

[11] 3,840,097
[45] Oct. 8, 1974

[54] ADJUSTABLE SHOCK ABSORBER

[75] Inventor: David M. Holley, Whitmore Lake, Mich.

[73] Assignee: W. E. Hennells Company, Inc., Ypsilanti, Mich.

[22] Filed: Jan. 22, 1973

[21] Appl. No.: 325,368

[52] U.S. Cl. .............................................. 188/287
[51] Int. Cl............................. F16f 9/48, F16f 9/44
[58] Field of Search ............... 188/285, 287; 213/43

[56] References Cited
UNITED STATES PATENTS

| | | | |
|---|---|---|---|
| 984,377 | 2/1911 | Kilgour | 188/287 |
| 3,344,894 | 10/1967 | Kenworthy | 188/287 |
| 3,510,117 | 5/1970 | Scholin et al. | 188/287 |
| 3,598,206 | 8/1971 | Hennells | 188/287 |

Primary Examiner—George E. A. Halvosa
Attorney, Agent, or Firm—Woodhams, Blanchard and Flynn

[57] ABSTRACT

An adjustable energy absorber including a housing having a ram slidably extending therefrom. The housing includes a first control sleeve which divides the housing into a pair of fluid chambers, the sleeve having a plurality of openings disposed in a substantially triangular arrangement and providing communication between the the two chambers. A second control sleeve surrounds the first sleeve and contains an axially extending row of openings therethrough. One of the control sleeves is rotatable to adjust the relative angular position between the control sleeves to selectively vary the number of overlapping openings to thus vary the energy absorbing capacity of the absorber. Imposition of a force on the ram causes the ram to force fluid from one chamber through the overlapping openings into the other chamber, which ram sequentially covers the overlapping openings as it moves axially of the housing.

8 Claims, 4 Drawing Figures

PATENTED OCT 8 1974 3,840,097

3,840,097

ADJUSTABLE SHOCK ABSORBER

FIELD OF THE INVENTION

This invention relates generally to energy absorbers and, in particular, to an adjustable hydraulic shock absorber which is capable of being adjusted to absorb shock loads of varying amounts.

BACKGROUND OF THE INVENTION

Energy absorbers have often been customized or built in accordance with the requirements of the particular load conditions under which they were to perform. This is highly undesirable since building a separate shock absorber for each type of job is costly and time consuming. Further, customized shock absorbers are necessarily of many different sizes and there is generally no standardization among the individual components thereof, thereby making maintenance unnecessarily difficult.

To overcome the above disadvantage, several energy absorbers have been commercially manufactured which permit the energy absorbing capability thereof to be adjusted in accordance with the expected load conditions, thereby permitting the shock absorber to be utilized in different loading and environmental conditions. While many of these adjustable energy absorbers have been adaptable to a wide range of load conditions, nevertheless these energy absorbers have not been as widely utilized as the area of need for same might indicate since they have been relatively costly. Specifically, most prior known adjustable energy absorbers have utilized a complex adjustment structure which is both expensive to manufacture and assemble and is difficult to use. Thus, the high cost of such adjustable energy absorbers, and inconvenience of use thereof, has greatly restricted the possible commercial utilization thereof.

Accordingly, it is an object of this invention to provide:

1. An improved energy absorber capable of being adjusted to absorb shock loads of varying amounts.
2. An energy absorber, as aforesaid, which is easily and precisely adjustable to vary the energy absorption characteristics thereof.
3. An energy absorber, as aforesaid, which permits the energy absorption characteristics to be precisely adjusted to a level compatible with the external loads imposed thereon.
4. An energy absorber, as aforesaid, which permits the stopping distance to be adjusted in proportion to the energy absorption characteristics.
5. An energy absorber, as aforesaid, which utilizes adjustment structure containing inner and outer concentric sleeves with one sleeve having an axially extending row of circular control openings therethrough and the other sleeve having a plurality of circular control openings therethrough and disposed in a triangular arrangement, whereby rotation of one sleeve relative to the other sleeve causes the numer of overlapping openings to be selectively increased or decreased to vary the energy absorption characteristics.
6. An energy absorber, as aforesaid, which is simple and compact in construction, economical to manufacture and efficient in operation.

Other objects and purposes of this invention will be apparent to persons acquainted with apparatus of this general type upon reading the following specification and inspecting the accompanying drawings.

Figure 1:
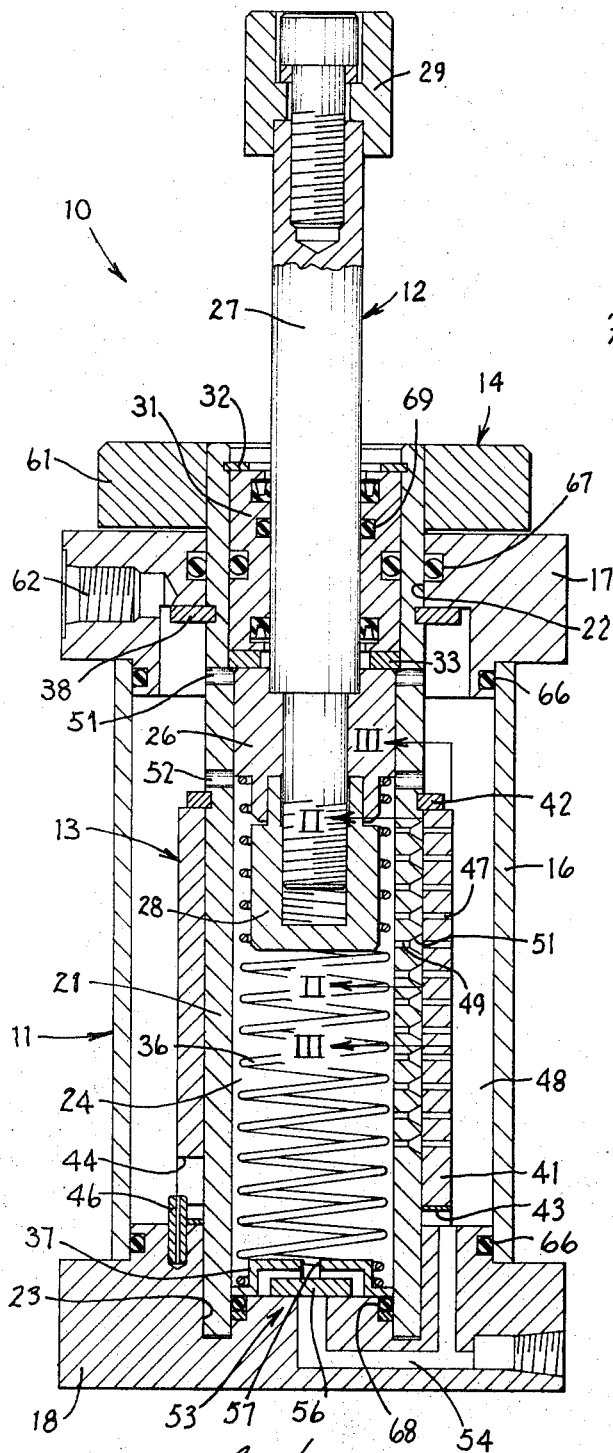
FIG. 1 is a sectional elevational view of an adjustable energy absorber constructed in accordance with the principles of the present invention.

Certain terminology will be used in the following description for convenience in reference only and will not be limiting. The words "upwardly," "downwardly," "rightwardly," and "leftwardly" will designate directions in the drawings to which reference is made. The words "inwardly" and "outwardly" will refer to the contraction and extension, respectively, of the reciprocal ram. The words "inwardly" and "outwardly" will also refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing an energy absorber having a housing which contains an adjustable sleeve means therein, which sleeve means divides the housing into a pair of fluid chambers. A ram extends from the housing and has a piston portion slideably received within one of the fluid chambers. The adjustable sleeve means includes inner and outer concentric control sleeves which are relatively rotatable. One of the sleeves has a plurality of openings therethrough and arranged in a triangular pattern which includes a plurality of axially extending rows of openings which are substantially parallel and circumferentially displaced from one another, with a different number of openings being contained in each row. The other sleeve has a single axially extending row of openings formed therein with the number of openings being designed to permit total overlap with the longest row of openings formed in the said one sleeve. Imposition of an external force on the ram causes the piston to move axially through the one chamber to force fluid therefrom into the other chamber, the piston progressively closing off the control openings to permit the absorption of energy. The quantity of energy absorbed can be adjusted by causing relative rotation between the inner and outer control sleeves to cause the row of openings in said other sleeve to overlap a selected row of openings in said one sleeve, thereby varying the number of overlapping openings.

DETAILED DESCRIPTION

The present invention comprises, as illustrated in FIG. 1, an energy absorber 10 which includes a conventional housing structure 11 having a ram means 12 slidably positioned within and extending therefrom. A flow control sleeve means 13 is positioned within the housing for controlling relative movement between the housing 11 and the ram means 12 due to imposition of an external load on the energy absorber 10. The quantity of energy absorbed by the device 10 can be selectively varied by an adjustment means 14 interconnected to the flow control sleeve means 13 as explained in detail below.

The housing 11 includes a hollow cylindrical sleeve 16 connected between a pair of end plates 17 and 18. The cylindrical sleeve 16 and the end plates 17 and 18 are fixedly interconnected by a plurality of bolts (not shown) as is conventional. The flow control sleeve means 13 includes a first cylindrical sleeve 21 positioned within the housing and extending substantially the full axial length thereof. The sleeve 21, hereinafter referred to as the inner control sleeve, is rotatably received at one end thereof within a bore 22 formed within and extending through the end plate 17. The other end of the inner control sleeve 21 is rotatably received within a recess 23 formed within the end plate 18.

The inner control sleeve 21 defines therein a first chamber 24 adapted to be filled with fluid. The ram means 12 includes a piston 26 snugly and slidably received within the first chamber 24, which piston 26 is fixedly connected by any conventional means, such as by means of the end cap 28, to an elongated piston rod 27. The piston rod 27 extends outwardly beyond the end plate 17 and is provided with a head portion 29 fixedly secured on the free end thereof. The piston rod 27 is snugly and slideably received within a bearing sleeve 31 positioned within the upper end of the inner control sleeve 21. The bearing sleeve 31 is axially retained within the control sleeve 21 by means of retainer rings 32 and 33 positioned adjacent the opposite ends thereof. A compression spring 36 is positioned within the first chamber 24 and has its upper end disposed in bearing engagement with the forward face of the piston 26, whereas the lower end of the compression spring 36 bears against a cup-like check valve retainer 37 which in turn is urged against the bottom wall of the housing. The spring 36 resiliently urges and normally maintains the ram means 12 in its extended position substantially as illustrated in FIG. 1. The piston 26 is thus normally maintained in abutting engagement with the inner end of the retainer ring 33.

The inner control sleeve 21 is provided with a plurality of primary control openings 39 extending radially therethrough. The primary openings 39 are preferably of circular cross section and are preferably disposed in a triangular arrangement which includes a plurality of rows of openings (FIG. 2), which rows extend axially of the control sleeve 21 but are substantially parallel and circumferentially spaced from one another. The axially extending rows have been designated R1 through R6 in FIG. 2 for purposes of identification. Further, the individual openings in the plurality of parallel rows are also preferably circumferentially aligned within circumferentially extending columns which have been designated C1 through C6 in FIG. 2 for identification purposes. The individual axially extending rows of openings each have a different number of openings 39 therein, with the number of openings in each axially extending row progressively varying in the circumferential direction of the control sleeve. Thus, the first axially extending row R1 includes six openings 39 therein, the next row R2 includes five openings 39 therein, with the succeeding rows containing a progressively decreasing number of openings so that the last row R6 contains only a single opening 39. The number of openings 39 in the axially extending rows, in the embodiment illustrated in FIG. 2, thus progressively decreases in a linear manner in proportion to the circumferential displacement of the rows. The exact purpose of this structure and the mode of operation of same will be explained in greater detail hereinafter.

The flow control sleeve means 13 also includes a further cylindrical sleeve 41, hereinafter referred to as the outer control sleeve. The outer control sleeve 41 is snugly but rotatably positioned on the inner control sleeve 21 in concentric relationship therewith. The upper end of the outer control sleeve 41 abuts a retainer ring 42 which is secured to the inner control sleeve 21, while the lower end of the outer control sleeve 41 is positioned adjacent the end plate 18, a suitable wave spring 43 being disposed therebetween. A further retainer ring 38 is secured to the inner control sleeve 21 in abutting engagement with the inner end of the upper end plate 17, whereby the retainer rings 38 and 42 thus prevent axial movement of both the inner and outer control sleeves relative to one another and relative to the housing. The outer control sleeve 41 is further provided with a narrow slot 44 adjacent the lower end thereof, which slot receives therein a pin 46 which is fixedly secured to the plate 18, whereby the outer control sleeve 41 is thus nonrotatably secured relative to the housing 11.

A plurality of secondary control openings 47 extend radially through the wall of the outer control sleeve 41, which openings are adapted to at least partially overlap some of the primary openings 39 to permit fluid communication between the first chamber 24 as defined within the interior of the inner control sleeve 21 and a second annular fluid chamber 48 as defined between the housing sleeve 16 and the outer control sleeve 41. The secondary openings 47 are substantially equally spaced from one another and are positioned within a substantially straight row which extends substantially axially of the outer control sleeve 41.

Figure 3:
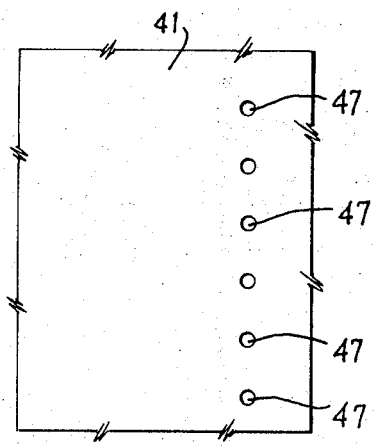
FIG. 3 is an enlarged fragmentary sectional view taken substantially along the line III—III of FIG. 1 and illustrating the arrangement of the control openings in the outer control sleeve.
Figure 4:
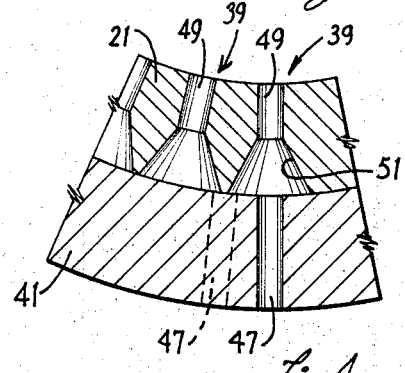
FIG. 4 is an enlarged fragmentary sectional view taken substantially along the line IV-IV of FIG. 2 and illustrating the manner in which the control openings of the inner and outer sleeves are positioned for overlapping communication with each other.

As illustrated in FIGS. 3 and 4, the primary openings 39 include a substantially circular opening portion 49 having a flared or conically enlarged end portion 51 formed on the radially outer end thereof, which enlarged opening portion 51 is adapted to overlap the secondary openings 47 as formed in the outer control sleeve 41. The cylindrical or circular opening portion 49 preferably has a diameter which is substantially smaller than, and at a maximum equal to, the diameter of the secondary opening 47. The primary openings 39 thus have a minimum flow area which is less than the flow area of the secondary openings 47. The primary openings 39 are thus effective for controlling the rate of flow between the chambers 24 and 48. Thus, when the secondary openings 47 are aligned with a row of primary openings 39, as illustrated by solid lines in FIG. 4, the rate of flow through the openings 39 and 47 is controlled by the small circular opening portion 49.

However, the diameter of the enlarged end portion 51 is preferably selected so that a certain amount of circumferential misalignment can exist between the inner and outer control sleeves 21 and 41, respectively, with the secondary opening 47 being capable of effectively overlapping a pair of circumferentially adjacent primary openings 39 as disposed in a pair of adjacent rows (as illustrated by dotted lines in FIG. 4) due to the ability of the opening 47 to circumferentially overlap a pair of adjacent enlarged end portions 51. In this situation, however, the flow rate between the chambers 24 and 48 is still effectively the same since the overlapping area between the opening 47 and the two adjacent end opening portions 51 is substantially equal to the area of the opening portion 49. This specific design feature eliminates the requirement that the rows of primary and secondary openings be precisely aligned, since proper flow between the chambers can still be achieved even when the primary and secondary rows are somewhat misaligned as illustrated by the dotted line position of the opening 47 in FIG. 4. In a preferred embodiment of the invention, the circular opening portion 49 preferably has an area which is approximately one-half the area of the secondary opening 47.

Figure 2:
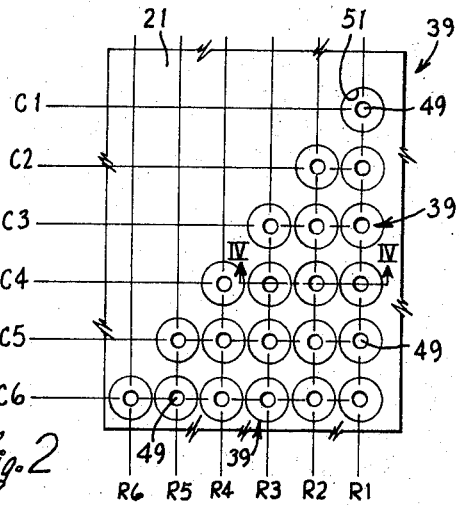
FIG. 2 is an enlarged fragmentary sectional view taken substantially along the line II—II in FIG. 1 and illustrating the arrangement of the control openings in the inner control sleeve.

Further, as illustrated in FIG. 1, the row of secondary openings 41 preferably contains therein a plurality of openings substantially equal to the number of openings contained in the longest row of primary openings 39, namely the row R1. Thus, when the row of secondary openings 47 is disposed to overlap the row R1 of primary openings, each of the primary openings will overlap and/or be aligned with a secondary opening to provide maximum communication between the chambers 24 and 48. While the invention as disclosed utilizes a separate secondary opening 47 disposed for overlapping relationship with each individual primary opening 39, it will be recognized that suitable variations can be made in the design of the secondary openings to accomplish the same basic flow achieved by utilizing the opening structure illustrated in FIGS. 2 and 3. For example, the row of secondary openings 47 could be replaced by an axially elongated slot having a length sufficient to overlap the longest row R1 of primary openings 39. In this latter proposed situation, the control of flow between chambers 24 and 48 would still be controlled by the openings 39. However, the use of individual circular openings as illustrated in FIGS. 2 and 3 is preferred, not only due to the simplicity of manufacturing the control sleeves, but also the strength of the energy absorber is not impaired.

As the ram means 12 is subjected to a load so as to cause same to be compressed or moved into the housing, downward movement of the piston 26 will cause fluid to flow from the first chamber 24 through the aligned primary and secondary openings into the second chamber 48. The downward movement of the piston 26 causes the creation of a further chamber between the rearward face of the piston 26 and the inner end of the bearing sleeve 31. To prevent the creation of a vacuum within this further chamber, the inner control sleeve 21 is provided with spaced radial openings 52 extending therethrough, which openings are adapted to communicate with said further chamber to permit flow of fluid from said second fluid chamber 48 into said further chamber as the piston 26 is moved downwardly away from the bearing sleeve 31.

The energy absorber 10 is further provided with a check valve assembly 53 which permits flow of fluid from the second chamber 48 to the first chamber 24 but prevents flow of fluid in a reverse direction. The check valve assembly 53 includes a passageway 54 formed in the end plate 18 and having one end thereof communicating with the chamber 48. The other end of the passageway 54 communicates with the chamber 24 but is normally maintained closed by means of a disc-like check valve 56, which check valve is confined within the cup-like retainer 37. The retainer 37 is further provided with a suitable flow opening 57 therethrough for enabling the flow of fluid from passage 54 into the chamber 24 when the ram means 12 is being extended or moved outwardly of the housing. However, when the ram means is being moved inwardly into the housing, the pressure imposed on the fluid within chamber 24 acts on the disc valve 56 and maintains same in seating engagement with the end plate 18 so as to close the end of the passage 54. The fluid is thus forced to flow through the aligned control openings 39 and 47 as it flows from the chamber 24 into chamber 48.

To permit the overlapping relationship of the primary and secondary openings to be varied, the energy absorber 10 is provided with the adjustment means 14 which includes an adjustment collar 61 nonrotatably secured to the inner control sleeve 21 and positioned adjacent one axial end of the housing 11, namely adjacent the end plate 17. The collar 61 is manually rotatable to permit a corresponding rotation of the inner control sleeve 21, which in turn caues a selected one of the axially extending rows of primary control openings 39 to be positioned in overlapping relationship with the row of secondary openings 47. The adjustment collar 61 may be provided with a suitable detent structure thereon disposed for collection within the plate 17, if desired, to enable the adjustment collar to be disposed in a plurality of preselected positions relative to the housing, which preselected positions correspond to the alignment of the various axially extending rows of primary openings with the rows of secondary openings. One type of suitable detent structure is illustrated in U.S. Pat. No. 3,598,206. Further, the adjustment collar 61 can also be provided with suitable indicia thereon adapted to cooperate with an arrow provided on the end plate to permit visual indication of the relative energy absorbing characteristics of the device, if desired, substantially as illustrated in said Pat. No. 3,598,206.

The end plate 17 is provided with a port 62 extending therethrough in communication with the second fluid chamber 48 to permit the energy absorber 10 to be filled with fluid. During operation of the energy absorber, the port 62 either contains a suitable plug therein or is utilized to connect the energy absorber to a conventional pressurized fluid accumulation chamber.

The energy absorber is further provided with resilient seal means 66, 67, 68 and 69, such as O-rings, in a conventional manner to provide leakage of fluid therefrom.

OPERATION

The operation of the device embodying the invention will be described in detail hereinbelow.

In an operational position, the energy absorber 10 will generally be mounted in place by means of the lower end plate 18 so that the cylinder rod 27, being normally urged into its extended position by the spring 36, will be engageable by the apparatus from which energy is to be absorbed so as to move the cylinder rod 27 inwardly for decelerating the apparatus or absorbing shock blows therefrom. The energy absorber 10 will first be filled with fluid, such as hydraulic oil, by means of the port 62, sufficient oil being placed in the housing 11 to at least completely fill the first fluid chamber 24. When so prepared, the energy absorber 10 is ready for use.

With the piston rod 27 in its extended position as shown in FIG. 1, the energy absorber 10 is in a position to receive an external load or shock blow thereon. This causes the piston rod 27 to move inwardly into the housing 11, which in turn causes downward movement of the piston 26. Downward movement of piston 26 causes pressurization of the fluid contained within the first chamber 24, which fluid is forced to flow outwardly through the overlapped primary and secondary openings into the second chamber 48. As the piston 26 moves axially toward the lower end of the chamber 24, it sequentially closes the primary openings 39. The number of openings providing flow communication from the chamber 24 to the chamber 48 is thus progressively decreased, which in turn progressively restricts the further flow of fluid from the chamber 24 to the chamber 48. This thus causes the piston 26 to progressively decelerate so that as the piston approaches the inner end of the chamber 24 (lower end in FIG. 1), the external shock load imposed on the energy absorber 10 will be substantially dissipated. In the event that the load imposed on the energy absorber is not entirely dissipated by the time the piston 26 closes off the last primary opening, then the remaining fluid trapped between the forward face of the piston 26 and the bottom wall of the housing will function as a solid stop for dissipating the remaining energy. When the inward movement of the piston has been stopped, and when the external load has been relieved from the head portion 29, the piston 26 and piston rod 27 will be returned to the original extended position due to the urging of the compression spring 36. During this return movement of the piston, the one way check valve 53 will open to permit fluid to flow from the second chamber 48 through the passage 54 into the first chamber 24. The check valve 53 thus facilitates the return flow of fluid from the chamber 48 to the chamber 24 to permit a more rapid return of the ram means 12 to the extended position.

As is well understood, the deceleration rate of the ram means 12 is determined by the quantity and velocity of the fluid escaping from the inner chamber 24 through the aligned primary and secondary openings to the outer chamber 48. To adjust the deceleration rate of the ram means 12 and thereby vary the energy dissipating characteristics of the energy absorber, the adjustment collar 61 is manually rotated, which causes a corresponding rotation of the inner control sleeve 21. Since the outer control sleeve 41 is nonrotatably secured to the housing 11, rotation of inner control sleeve 21 causes a variation in the number of overlapping primary and secondary control openings, thereby permitting a variation of the deceleration rate and energy dissipating characteristics of the energy absorber 10.

Particularly, when the inner control sleeve 21 is positioned as illustrated in FIG. 1, the row R1 of primary openings 39 is disposed so as to align with the row of secondary openings 47. Thus, each secondary opening 47 is aligned with a primary opening, and accordingly, the stopping and deceleration distance of the ram means 12 is a maximum since the row R1 contains therein the greatest number of primary openings 39. However, if the collar 61 and inner control sleeve 21 are rotated to a position, for example, wherein the row R4 of primary openings 39 is disposed in alignment and overlapping relationship with the row of secondary openings 47, then the deceleration and stopping distance of the energy absorber 10 is substantially reduced, since the row R4 contains therein fewer primary openings 39, particularly the row R4 contains therein three less primary openings 39. Thus, the three uppermost secondary openings 47 are substantially closed inasmuch as they do not align with any primary openings 39 so that the resulting energy absorption characteristics and the resulting stopping distance of the energy absorber 10 is thus effectively changed.

In view of the above explanation, it will be readily apparent that the effective flow control area between the chambers 24 and 48, as provided by the overlapping openings 39 and 47, is effectively constant per unit distance of travel of the ram means 12, irrespective of which row of primary openings 39 is aligned with the rows of secondary openings 47. However, the number of effective distance units of travel of the ram during which the energy of the ram is absorbed and the ram is decelerated is selectively varied in accordance with which row of primary openings 39 is disposed in alignment with the row of secondary openings 47. The adjustment in the present invention thus results in an adjustment of the distance over which the ram is stopped and the ram energy is absorbed, whereas the flow control area per unit of distance travelled by the ram remains constant irrespective of which stopping distance is selected, namely irrespective of which row of primary openings 39 is positioned in alignment with the row of secondary openings 47.

By utilization of a plurality of circumferentially spaced rows of primary openings, such as illustrated in FIG. 2, the rows can be spaced a substantial distance apart, such as in the order of between 5 and 10° apart. In this manner, the adjustment of the energy absorber can be accomplished in any easy and efficient manner inasmuch as the proper adjustment of the device is thus easily accomplished merely by rotation of the adjustment collar 61 through an easily determinable angle which is of sufficient magnitude so as to permit simple yet accurate adjustment of the device.

Although a particular preferred embodiment of the invention has been discussed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. In an adjustable fluid energy absorber, comprising in combination:

housing means including a central tubular housing member and a pair of end members positioned adjacent opposite ends of said central tubular housing member;

sleeve means disposed in said housing member to form a first fluid chamber within the interior of said sleeve means and a second fluid chamber between said sleeve means and said tubular housing member;

ram means slidably disposed on said housing means for receiving a shock load thereon, said ram means including a piston slidably disposed within one of said fluid chambers and a piston rod connected to said piston and extending outwardly from one end of said housing means;

said sleeve means including a first sleeve member having a plurality of circular openings extending radially therethrough to permit fluid communication between said first and second chambers;

said plurality of said circular openings being arranged in a plurality of substantially parallel rows which extend substantially axially of said first sleeve member, said plurality of parallel rows being spaced from one another circumferentially of said first sleeve member, each of said rows being formed by a different number of circular openings, the circular openings all being of substantially the same diameter and being substantially uniformly axially spaced apart, and the individual openings of the adjacent rows being substantially directly aligned with one another in the circumferentially extending direction of said first sleeve member; and control means for varying the effective flow area of the plurality of openings formed in said first sleeve member for selectively varying the energy dissipation characteristics of said energy absorber, said control means including a second sleeve member disposed substantially adjacent and in concentric, rotatable relationship with said first sleeve member, said second sleeve member having opening means extending radially therethrough, said opening means being of narrow circumferential extent but being elongated axially of said second sleeve member and positionable to at least partially overlap the circular openings of a selected one of the rows of openings formed in said first sleeve member, the remaining rows of openings formed in said first sleeve member being effectively closed by said second sleeve member; and adjustment means, including a movable adjustment member positioned externally of said housing means, operatively interconnected to one of said sleeve members for permitting relative rotational movement between said sleeve members for permitting said opening means to be selectively positioned in overlapping relationship with any of said rows of circular openings formed in said first sleeve member for permitting the energy dissipation characteristics of said absorber to be selectively varied.

2. An energy absorber according to claim 1, wherein said opening means as formed in said second sleeve member includes a plurality of circular openings extending radially through said second sleeve member and disposed within a single substantially axially extending row.

3. An energy absorber according to claim 2, wherein the openings as formed in said first sleeve member are of variable cross-sectional area as they extend radially through said first sleeve member, each of the openings formed in said first sleeve member having a first minimum cross-sectional area for controlling the quantity of fluid flowing therethrough, each of said openings in said first sleeve member also having a second cross-sectional area adjacent the radially outer end thereof, said second cross-sectional area being substantially larger than said first cross-sectional area, and the openings as formed in said second sleeve member each being of a third cross-sectional area which is greater than said first cross-sectional area but substantially less than said second cross-sectional area whereby flow through the openings in said first and second sleeve members is controlled by said first cross-sectional area, and the adjacent rows of openings in said first sleeve member being positioned closely adjacent one another so that the openings in said second sleeve member can partially overlap the radially outer ends of the openings of two rows as formed in said first sleeve member.

4. In an adjustable fluid energy absorber, the combination of:

housing means including a central tubular housing member and a pair of end members positioned adjacent opposite ends of said central tubular housing member;

sleeve means disposed in said housing member so as to form a first fluid chamber within the interior of said sleeve means and a second fluid chamber between said sleeve means and said tubular housing member;

ram means slidably disposed on said housing means for receiving a shock load thereon, said ram means including a piston slidably disposed within one of said fluid chambers and a piston rod connected to said piston and extending outwardly from one end of said housing means;

said sleeve means including a first sleeve member having first opening means extending radially therethrough to permit fluid communication between said first and second chambers, whereby movement of said piston axially of said one chamber causes fluid to flow from said one chamber through said opening means into said other chamber; and control means for varying the effective flow area defined by said opening means to selectively vary the energy dissipation characteristics of said energy absorber, comprising the improvement wherein said control means includes means for selectively varying the effective length of said flow area of said first opening means in the axially extending direction of said first sleeve member while maintaining the effective flow area substantially constant per unit distance of displacement of said piston in said axial direction, whereby said control means is effective to enable the axial stopping of said ram means to be selectively varied;

said control means including a second sleeve member disposed substantially adjacent and in concentric, rotatable relationship with said first sleeve member, said second sleeve member having second opening means extending radially therethrough, said second opening means being positioned to partially overlap said first opening means;

one of said opening means extending over a substantial circumferential extent of its respective sleeve member with the axial length of said one opening means progressively increasing as said one opening means extends circumferentially through an angle defined between two extremes, and the other opening means extending axially through a distance at least equal to the maxium axial extent of said one opening means and extending circumferentially of said last-mentioned sleeve member through an angle substantially less than said one opening means, whereby said other opening means overlaps only a small fraction of the circumferential extent of said one opening means, the axial length of the overlapped area of said first and second opening means being dependent upon the circumferential position of said other opening means relative to said one opening means;

said one opening means including a plurality of openings extending radially through the respective sleeve member to permit fluid communication between said first and second chambers, said plurality of openings being arranged in a plurality of substantially parallel rows which extend substantially axially of said respective sleeve member, said plurality of parallel rows being spaced from one another circumferentially of said respective sleeve member, each of said rows being formed by a different number of openings, the openings all being of substantially the same cross-sectional area and being substantially uniformly axially spaced apart, and the individual openings of the adjacent rows being substantially directly aligned with one another in the circumferentially extending direction of said respective sleeve member.

5. An energy absorber according to claim 4, wherein there are at least three of said parallel rows of openings extending axially of said respective sleeve member and spaced circumferentially thereof from one another, said three rows of openings being circumferentially adjacent one another and including a first row positioned on one side of a second row and a third row positioned on the opposite side of said second row from said first row, and said second row of openings containing therein a number of openings which is greater than the number of openings in said third row but is less than the number of openings in said first row.

6. An energy absorber according to claim 4, wherein said other opening means comprises a single row of substantially identical openings, said single row of openings extending axially of its respective sleeve member, said single row of openings containing therein a number of openings which is substantially the same as the number of openings contained in the longest row of openings associated with said one opening means.

7. An energy absorber according to claim 6, wherein the individual openings contained within each row associated with said one opening means each includes a flared conical portion adapted to communicate at the maximum diameter thereof with the openings associated with said single row.

8. An energy absorber according to claim 4, further including adjustment means operatively interconnected to said second sleeve member for permitting rotation thereof relative to said first sleeve member for permitting said second opening means to be selectively positioned in overlapping relationship with said first opening means for permitting the energy dissipation characteristics of said absorber to be selectively varied, said adjustment means including a manually rotatable adjustment member disposed directly adjacent the exterior axial end face of one of said end members and fixedly interconnected to the adjacent axial end of said second sleeve member for permitting relative rotation between said first and second sleeve members, said adjustment member being coaxial with and rotatably movable substantially about the longitudinal axis of said piston rod.

* * * * *